United States Patent [19]

Burnard et al.

[11] Patent Number: 5,320,379
[45] Date of Patent: Jun. 14, 1994

[54] INFLATOR MOUNTING SYSTEM

[75] Inventors: Dennis W. Burnard, Roseville; Timothy E. Hughes, Livonia; Brian T. Seymour, Royal Oak; Steven J. Anderson, Willis, all of Mich.

[73] Assignee: Automotive Systems Laboratory, Inc., Farmington Hills, Mich.

[21] Appl. No.: 57,324

[22] Filed: May 5, 1993

[51] Int. Cl.⁵ .............................................. B60R 21/16
[52] U.S. Cl. ............................... 280/728 A; 280/731; 280/739
[58] Field of Search ............... 280/728 A, 731, 732, 280/743 R, 739, 728 R; 141/313, 314; 403/254, 70, 71

[56] References Cited

U.S. PATENT DOCUMENTS

| | | | |
|---|---|---|---|
| 4,988,119 | 1/1991 | Hartmeyer | 280/728 A |
| 5,064,218 | 11/1991 | Hartmeyer | 280/728 A |
| 5,141,247 | 8/1992 | Barth | 280/728 A |
| 5,259,641 | 11/1993 | Schenk et al. | 280/731 |

FOREIGN PATENT DOCUMENTS 4201645  7/1992  Japan ................. 28/728 A

*Primary Examiner*—Karin L. Tyson
*Assistant Examiner*—Peter English
*Attorney, Agent, or Firm*—Lyman R. Lyon

[57] ABSTRACT

A system for mounting an airbag and airbag inflator comprises an airbag inflator having a plurality of clips that are engagable with a mounting plate. The airbag is interposed between the inflator and the mounting plate when the clips on the inflator are engaged with the mounting plate so as to support the airbag and seal the interface between the inflator and mounting plate. Gas flow incident to deflation of the airbag is vented through the mounting plate.

5 Claims, 1 Drawing Sheet

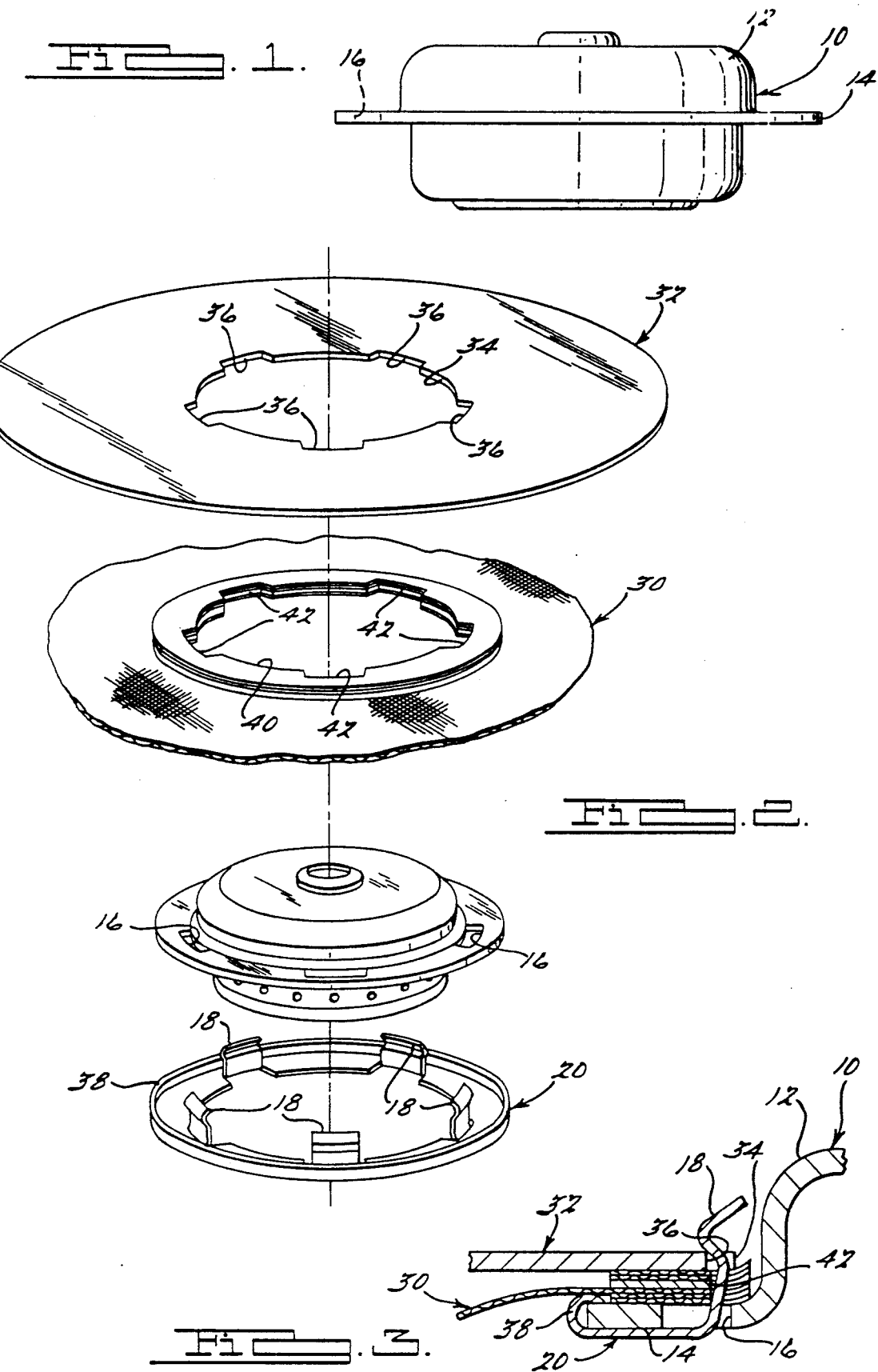

INFLATOR MOUNTING SYSTEM

BACKGROUND OF THE INVENTION

The major components of a typical state-of-the-art inflatable vehicle occupant restraint mechanism are an inflator, an inflatable airbag, and a mounting plate therefor. The airbag is generally secured to the inflator and/or mounting plate by a plurality of rivets and/or threaded fasteners. The inflator is typically secured to the mounting plate on the opposite side thereof from the airbag by additional fasteners. An O-ring or other form of seal is usually positioned between the inflator and the mounting plate to prevent inflation gases from escaping during deployment.

The aforesaid construction is less than satisfactory in that it requires multiple rivets and/or threaded fasteners for both inflator and airbag retention. Moreover, the inflator and airbag are fastened to the mounting plate in separate assembly operations. The seal required to prevent high pressure high temperature inflation gases from escaping into the vehicle passenger compartment between the mounting plate and inflator during deployment, thereby reducing airbag pressure, is a source of system failure. Ultimate venting of the spent inflation gases is through vents in the bag into the passenger space.

SUMMARY OF THE INVENTION

The aforesaid problems are solved by the inflator and airbag mounting system of the present invention which utilizes snap-in fasteners that achieve fast, simple initial installation as well as implement subsequent disassembly for servicing. The periphery of the airbag is sandwiched between a flange of the inflator and the mounting plate to effect attachment of the airbag as well as to function as a seal, thereby eliminating the requirement for a separate O-ring seal. The inflator and airbag are secured to the mounting plate in a single operation by multiple fasteners which, in a preferred embodiment, comprise fingers of a retaining ring which is secured to the inflator.

The mounting system of the present invention also provides for controlled venting of spent gas from the airbag cushion into the steering column, and away from vehicle occupants to achieve deflation of the airbag. Such venting eliminates passing of the gases through vents in the airbag for exhausting into the passenger compartment as in conventional practice.

In a preferred constructed embodiment, the inflator mounting system of the present invention comprises a retaining ring that is secured to a circular radially extending flange of the inflator as by roll crimping the periphery thereof about the outer circumferential edge of the inflator flange or by welding in strategic locations. The retaining ring has a plurality of fingers which pass through complementary slots in the circular mounting flange of the inflator.

The retainer ring/inflator assembly is positioned internally of the airbag within a complementary opening therein. The retainer ring/inflator/ airbag assembly is then positioned against the mounting plate so that the inflator flange sandwiches the periphery of the opening in the airbag between the inflator flange and the mounting plate. The fingers of the retaining ring snap into complementary detents in the mounting plate as the inflator/airbag assembly is pressed thereagainst.

The aforesaid arrangement permits assembly and subsequent disassembly for servicing the airbag and steering column systems. All threaded fasteners are eliminated. No separate seal is required between the inflator and the mounting plate.

Controlled venting of the airbag through the rectangular slots in the inflator flange is achieved by tailoring the open area of the slots in the inflator flange to a desired airbag collapse rate. Bag venting is controlled without requiring vent holes in the bag itself as is required in conventional airbag systems. The aforesaid construction has the advantage of not only eliminating vent holes in the bag, but also that of directing the vented exhaust gas into the steering column where it will not come in contact with a vehicle occupant, a major concern, and in some instances a point of litigation, with many state-of-the-art systems currently in use.

BRIEF DESCRIPTION OF THE DRAWINGS

FIG. 1 is an elevational view of an airbag inflator;

FIG. 2 is a perspective view of the components of the airbag mounting system of the present invention prior to assembly; and FIG. 3 is a fragmentary enlarged cross-sectional view of the assembled mounting system.

DETAILED DESCRIPTION OF THE PREFERRED EMBODIMENT OF THE INVENTION

As seen in the drawing, an airbag inflator 10 comprises a housing 12 having a circular peripheral flange 14. The flange 14 is provided with a plurality of circumferentially spaced apertures 16 for the acceptance of a like plurality of spring fasteners or, as shown in the disclosed preferred constructed embodiment, fingers 18 of a retainer ring 20. The retainer ring 20 has an annular reentrantly folded peripheral edge flange 38 that is crimped about the flange 14 of the inflator 10.

As best seen in FIG. 3 of the drawing, an airbag 30 is sandwiched between the peripheral flange 14 of the inflator 10 and a mounting plate 32. The mounting plate 32 has a circular aperture 34 with a plurality of notches 36 complementary to the position, size and configuration of the clips 18 on the retainer ring 20 for the acceptance thereof in snap-in relationship.

Assembly of the inflator mounting system of the invention is initiated by first crimping a flange 38 on the retainer ring 20 about the flange 14 of the inflator 10 with the spring fingers 18 of the retainer ring 20 extending through the apertures 16 of the flange 14. Thereafter, the inflator/retaining ring assembly is inserted through a central aperture 40 in the airbag 30. It is to be noted that the aperture 40 has a plurality of cut out portions 42 complementary to the notches 36 in the mounting plate 32 for a reason to be discussed.

The assembled inflator 10 and airbag 30 are positioned relative to the mounting plate 32 so that the spring fingers 18 of the retainer ring 20 snap into the complementary apertures 36 in the mounting plate 32.

As best seen in FIG. 3 of the drawings, the apertures 16 in the flange 14 of the inflator 10, in combination with the apertures or cut out portions 42 and 36 in the airbag 30 and mounting plate 32, respectively, provide for the venting of gas from the interior of the airbag 30 into a space behind the mounting plate 32 which, in the environment in which the invention has utility, comprises the space within the steering column of a vehicle.

In this manner, hot gases that first effect inflation of the airbag 32 are subsequently vented into the steering column of the vehicle, as opposed to the passenger compartment.

While the preferred embodiment of the invention has been disclosed, it should be appreciated that the invention is susceptible of modification without departing from the scope of the following claims.

We claim:

1. A system for mounting an airbag and airbag inflator comprising:
    a mounting plate;
    an airbag inflator comprising a housing having a gas discharge orifice and a peripheral flange;
    an airbag having a portion completely covering the flange on said inflator and an aperture aligned with the orifice on said inflator; and
    a plurality of resilient fasteners secured to said inflator and extending at substantially a right angle to the flange thereof, said fasteners being engagable with said mounting plate with said airbag being interposed between the flange on said inflator and said mounting plate thereby to seal the interface between said inflator and said mounting plate.

2. A mounting system in accordance with claim 1 wherein said fasteners are integral with a retainer and said retainer is crimped to the flange of said inflator.

3. A mounting system in accordance with claim 1 wherein the flange on said inflator and the aperture in said airbag are circular.

4. The system of claim 1 wherein the flange in said inflator has a plurality of apertures for the venting of gas from said airbag.

5. The system of claim 4 wherein said fasteners extend through the apertures in the flange of said inflator.

* * * * *